United States Patent
Kesterson et al.

(10) Patent No.: US 11,965,519 B2
(45) Date of Patent: Apr. 23, 2024

(54) DYNAMICALLY CONTROLLED COOLING DEVICE

(71) Applicants: Kelly Kesterson, Fresno, TX (US); John Scott Hinklin, Pearland, TX (US)

(72) Inventors: Kelly Kesterson, Fresno, TX (US); John Scott Hinklin, Pearland, TX (US)

(*) Notice: Subject to any disclaimer, the term of this patent is extended or adjusted under 35 U.S.C. 154(b) by 0 days.

(21) Appl. No.: 18/206,866

(22) Filed: Jun. 7, 2023

(65) Prior Publication Data
US 2023/0366408 A1 Nov. 16, 2023

Related U.S. Application Data

(63) Continuation-in-part of application No. 17/743,063, filed on May 12, 2022, now Pat. No. 11,674,523.

(51) Int. Cl.
| | |
|---|---|
| *F04D 27/00* | (2006.01) |
| *F04D 3/00* | (2006.01) |
| *F04D 25/08* | (2006.01) |
| *F04D 25/10* | (2006.01) |
| *G05B 15/02* | (2006.01) |
| *G06V 40/10* | (2022.01) |

(52) U.S. Cl.
CPC ............ *F04D 27/00* (2013.01); *F04D 3/005* (2013.01); *F04D 25/084* (2013.01); *F04D 25/105* (2013.01); *G05B 15/02* (2013.01); *G06V 40/10* (2022.01); *G06V 2201/07* (2022.01)

(58) Field of Classification Search
CPC ....... F04D 25/10; F04D 25/105; F04D 29/287
See application file for complete search history.

(56) References Cited

U.S. PATENT DOCUMENTS

| | | | |
|---|---|---|---|
| 8,634,961 B2 * | 1/2014 | Lee | F04D 25/105 382/294 |
| 10,323,854 B2 | 6/2019 | Byers | |
| 10,597,155 B2 | 3/2020 | Karabed | |
| 10,690,372 B2 | 6/2020 | Arens | |
| 10,989,209 B2 | 4/2021 | Xing | |
| D969,301 S * | 11/2022 | He | D23/382 |
| 2017/0248970 A1 | 8/2017 | Karabed | |
| 2019/0003480 A1 | 1/2019 | Hall | |

FOREIGN PATENT DOCUMENTS

WO WO2015095753 6/2015

* cited by examiner

*Primary Examiner* — Brian O Peters

(57) ABSTRACT

A dynamically controlled cooling device includes a stand having deployable legs for positioning the stand on a floor in a selectable position. A fan is coupled to the stand. A fan direction motor is coupled to the stand for selectively rotating the fan relative to the stand. A camera having a targeting function for identifying a person within a field of vision of the camera is coupled to the fan. A processor is operationally coupled to the camera and the fan direction motor to rotate the fan to point at the person.

13 Claims, 6 Drawing Sheets

DYNAMICALLY CONTROLLED COOLING DEVICE

CROSS-REFERENCE TO RELATED APPLICATIONS

I hereby claim the benefit under 35 U.S.C., Section 120 of U.S. application Ser. No. 17/743,063 filed on May 12, 2022.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cooling devices and more particularly pertains to a new cooling device for targeted cooling of a moving or stationary user. The present invention discloses a cooling device comprising a fan on a positionable floor stand and a camera. A processor is operationally coupled to the camera and positional motors such that the fan tracks to motion of a user detected through the camera.

(2) Description of Related Art Including Information Disclosed Under 37 CFR 1.97 and 1.98

The prior art relates to cooling devices. Prior art cooling devices may comprise fans that are in a static position on a structure or tiltable fans, which may be movable along tracks. Related prior art comprises drones that are programmed to cast their shadows upon users or to direct air from their propellers onto users. What is lacking in the prior art is a cooling device comprising a fan on a positionable floor stand and a camera. A processor is operationally coupled to the camera and positional motors such that the fan tracks to motion of a user detected through the camera.

BRIEF SUMMARY OF THE INVENTION

An embodiment of the disclosure meets the needs presented above by generally comprising a stand having deployable legs for positioning the stand on a floor in a selectable position. A fan is coupled to the stand. A fan direction motor is coupled to the stand for selectively rotating the fan relative to the stand. A camera having a targeting function for identifying a person within a field of vision of the camera is coupled to the fan. A processor is operationally coupled to the camera and the fan direction motor to rotate the fan to point at the person.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
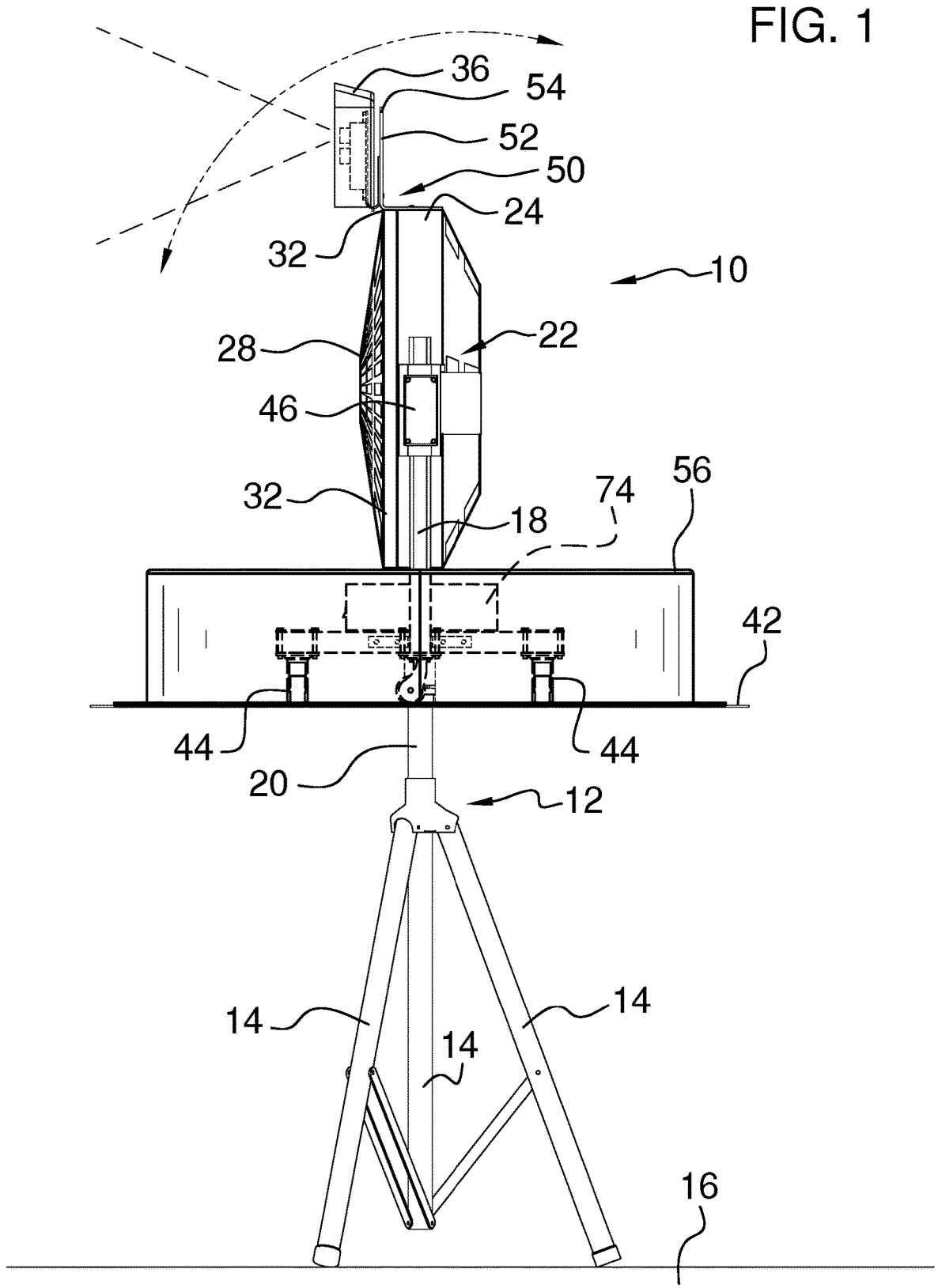
FIG. 1 is a side view of a dynamically controlled cooling device according to an embodiment of the disclosure.
Figure 2:
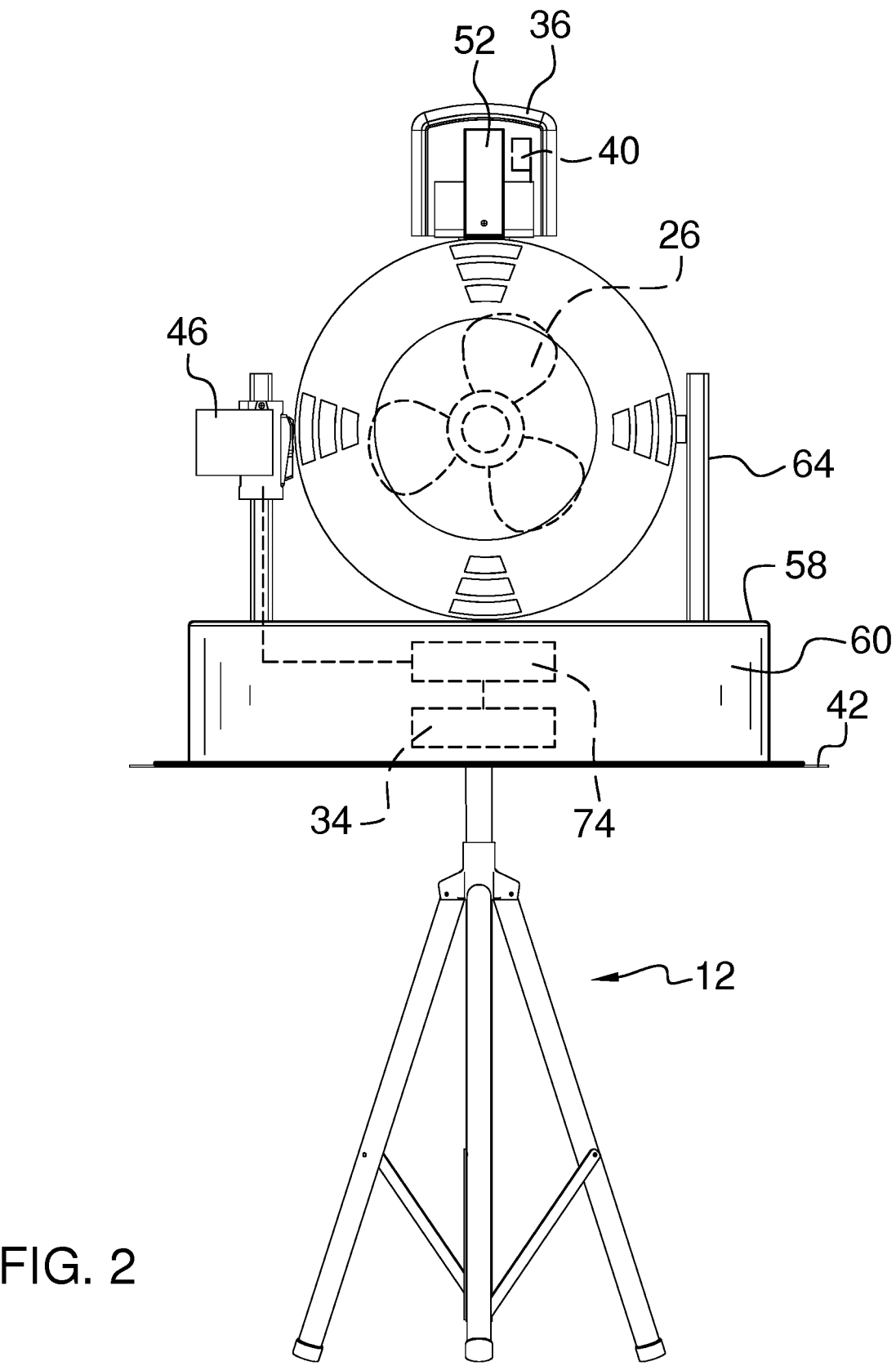
FIG. 2 is a rear view of an embodiment of the disclosure.
Figure 3:
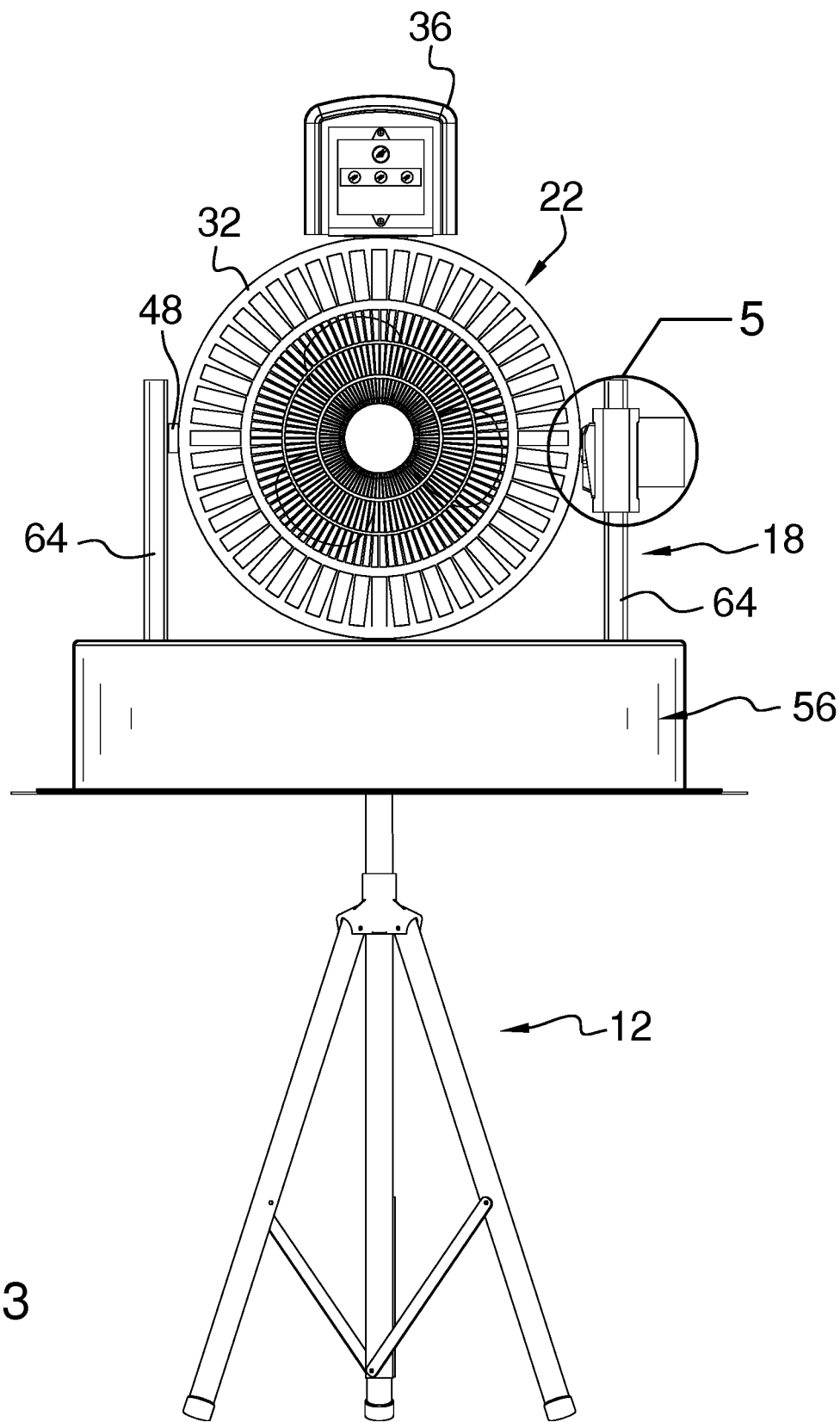
FIG. 3 is a front view of an embodiment of the disclosure.
Figure 4:
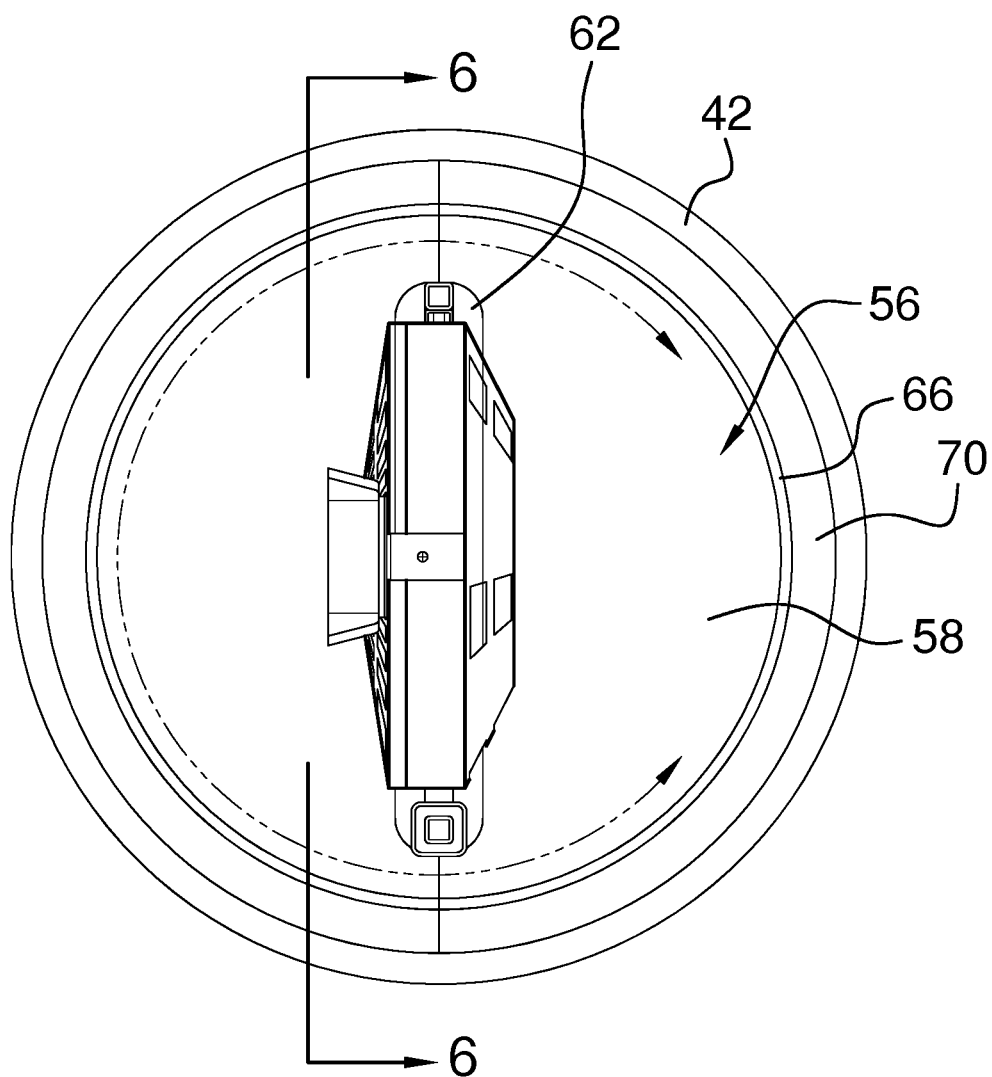
FIG. 4 is a top view of an embodiment of the disclosure.
Figure 5:
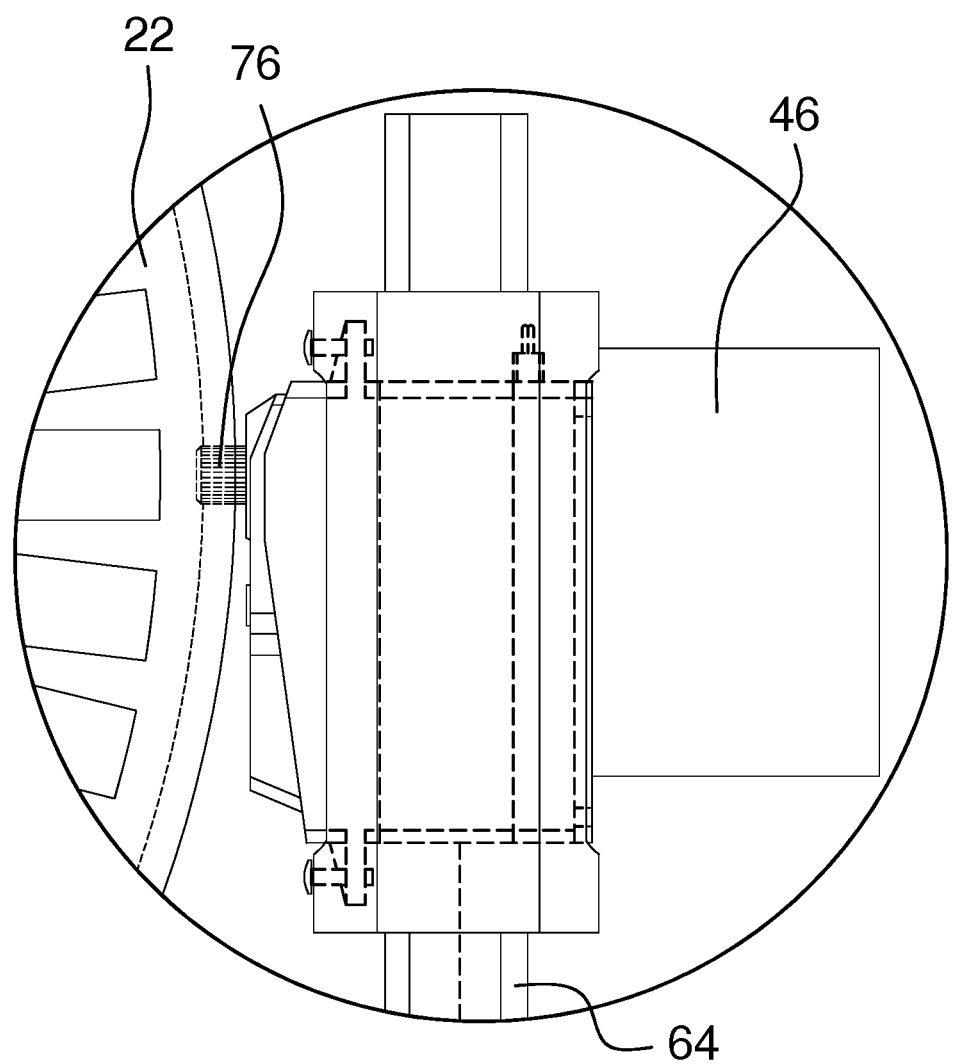
FIG. 5 is a detailed view of an embodiment of the disclosure as indicated by circle 5 in FIG. 3.
Figure 6:
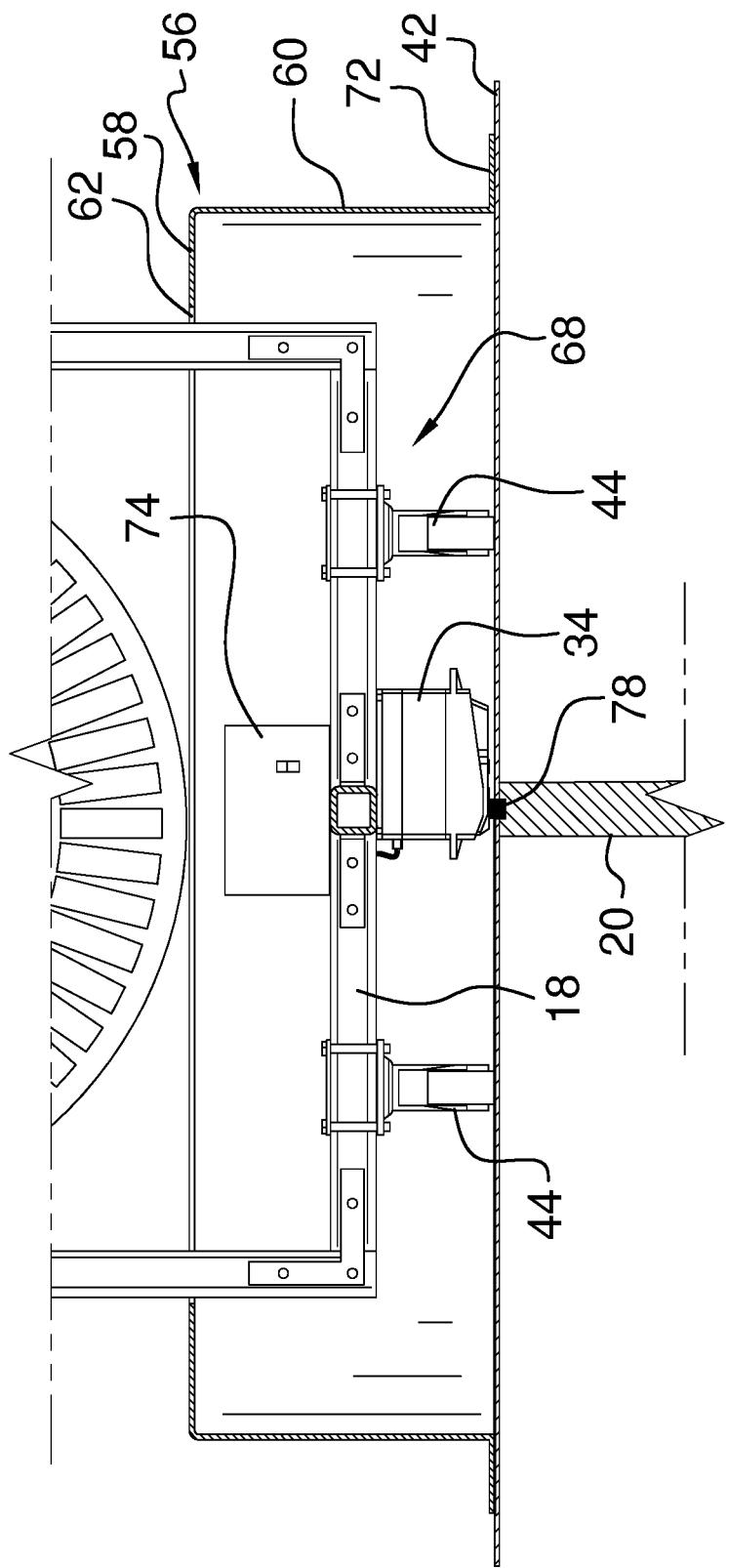
FIG. 6 is a cross-sectional view of an embodiment of the disclosure taken along line 6-6 in FIG. 4.

With reference now to the drawings, and in particular to FIGS. 1 through 6 thereof, a new cooling device embodying the principles and concepts of an embodiment of the disclosure and generally designated by the reference numeral 10 will be described.

As best illustrated in FIGS. 1 through 6, the dynamically controlled cooling device 10 generally comprises a stand 12. The stand 12 has a plurality of legs 14. The legs 14 are deployable in the form of a tripod. Thus, the stand 12 is configured for positioning on a floor 16 in a selectable position. The stand 12 includes a yoke 18 rotationally coupled to a vertical support 20 of the stand 12. A fan 22 is coupled to the stand 12. The fan 22 is pivotally coupled to the yoke 18. The fan 22 has a guard 24 extending around rotatable blades 26. The guard 24 has a front screen 28 and a peripheral wall 30 extending from a peripheral edge 32 of the front screen 28.

A fan direction motor 34 is coupled to the stand 12 by a fan direction gear 78. The fan direction motor 34 rotates relative to the fan direction gear 78 to selectively rotate the fan 22 relative to the stand 12 to point the fan 22 in a selectable direction. A camera 36 coupled to the fan 22. The camera 36 has a targeting function wherein the camera 36 is configured for identifying a person within a field of vision of the camera 36. The camera 36 is directed outwardly from the fan 22 such that the fan 22 is configured to direct air flow in an equivalent direction as the camera 36 is directed. A processor 40 is operationally coupled to the camera 36 and the fan direction motor 34 wherein the processor 40 activates the fan direction motor 34 such that the fan direction motor 34 is configured to rotate the fan 22 to point at the person. The operational connection of the processor 40 to the fan direction motor may be wired or wireless. A base plate 42 is coupled to the stand 12. The yoke 18 is positioned over the base plate 42. Each of a plurality of casters 44 is coupled to the yoke 18. Each of the casters 44 is positioned to roll on the base plate 42 wherein the casters 44 facilitate rotation of the fan 22 relative to the stand 12.

A fan tilt motor 46 is coupled to the yoke 18 and the fan 22. The fan tilt motor 46 is coupled to the fan 22 by a fan tilt gear 76 which tilts the fan 22 when the gear 76 is rotated by the fan tilt motor 46. The fan tilt motor 46 selectively pivots the fan 22 relative to the yoke 18. The processor 40 is operationally coupled to the fan tilt motor 46 wherein the processor 40 activates the fan tilt motor 46 such that the fan tilt motor 46 is configured to tilt the fan 22 to point at the person. A fan pivot clamp 48 is coupled to the yoke 18. The fan pivot clamp 48 restricts pivoting of the fan 22 relative to the yoke 18 when the fan pivot clamp 48 is engaged to the fan 22. The fan 22 is pivotable relative to the yoke 18 when the fan pivot clamp 48 is disengaged from the fan 22.

A bracket 50 is coupled to the fan 22. The bracket 50 has a camera connection flange 52 extending upwardly from an apex of the fan 22. The camera 36 is coupled to the camera connection flange 52. The camera connection flange 52 is coplanar with the peripheral edge 32 of the front screen 28. The camera 36 is positioned on a front face 54 of and extends forwardly from the camera connection flange 52.

A cover 56 has a top wall 58 and an outer wall 60 extending from the top wall 58. The top wall 58 has a slot 62. The yoke 18 has a pair of uprights 64 extending through the slot 62. The fan 22 is coupled to the uprights 64 such that the fan 22 is positioned over the top wall 58. A distal edge 66 of the outer wall 60 relative to the top wall 58 rests on the base plate 42 defining an interior space 68 between the top wall 58 of the cover 56 and the base plate 42. The cover 56 has a lip 70 extending radially outward from the distal edge 66 of the outer wall 60. The lip 70 has a planar bottom surface 72 abutting the base plate 42. A power supply 74 is positioned in the interior space 68. The power supply 74 is electrically coupled to the fan direction motor 34 and the fan tilt motor 46.

In use, the camera 36 tracks the person using software or the like which is commonly used to find and focus on persons within the field of view of the camera lens. The target position information is provided to the processor 40 which then activates the fan direction motor 34 and/or the fan tilt motor 46 such that the fan 22 is directed to the target person. As the person moves, the camera 36 maintains targeting of the person and the processor maintains positioning of the fan, and the camera, to maintain direction towards the person such that the fan continues to provide cooling to the person as the person moves.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A dynamically controlled cooling device comprising:
   a stand, said stand having a plurality of legs, said legs being deployable wherein said stand is configured for positioning on a floor in a selectable position;
   a fan coupled to said stand;
   a fan direction motor coupled to said stand, said fan direction motor selectively rotating said fan relative to said stand;
   a camera coupled to said fan, said camera having a targeting function wherein said camera is configured for identifying a person within a field of vision of the camera; a processor operationally coupled to said camera and said fan direction motor wherein said processor activates said fan direction motor such that the fan direction motor is configured to rotate said fan to point at the person; a base plate coupled to said stand; said stand including a yoke rotationally coupled to a vertical support of said stand over said base plate, said fan being pivotally coupled to said yoke; and a plurality of casters coupled to said yoke, each of said casters being positioned to roll on said base plate wherein said casters facilitate rotation of said fan relative to said stand.

2. The dynamically controlled cooling device of claim 1, further comprising:
   a fan tilt motor coupled to said yoke and said fan, said fan tilt motor selectively pivoting said fan relative to said yoke; and
   said processor being operationally coupled to said fan tilt motor wherein said processor activates said fan tilt motor such that said fan tilt motor is configured to tilt the fan to point at the person.

3. The dynamically controlled cooling device of claim 1, further comprising said camera being directed outwardly from said fan such that said fan is configured to direct air flow in an equivalent direction as said camera is directed.

4. The dynamically controlled cooling device of claim 1, further comprising a fan pivot clamp coupled to said yoke, said fan pivot clamp restricting pivoting of said fan relative to said yoke when said fan pivot clamp is engaged to said fan, said fan being pivotable relative to said yoke when said fan pivot clamp is disengaged from said fan.

5. The dynamically controlled cooling device of claim 1, said fan having a guard extending around rotatable blades, said guard having a front screen and a peripheral wall extending from a peripheral edge of said front screen.

6. The dynamically controlled cooling device of claim 5, a bracket coupled to said fan, said bracket having a camera connection flange extending upwardly from an apex of said fan, said camera being coupled to said camera connection flange.

7. The dynamically controlled cooling device of claim 6, said camera connection flange being coplanar with said peripheral edge of said front screen.

8. The dynamically controlled cooling device of claim 7, said camera being positioned on a front face of and extending forwardly from said camera connection flange.

9. The dynamically controlled cooling device of claim 1, a cover having a top wall and an outer wall extending from said top wall, said top wall having a slot, said yoke having a pair of uprights extending through said slot, said fan being coupled to said uprights such that said fan is positioned over said top wall.

10. The dynamically controlled cooling device of claim 9, a distal edge of said outer wall relative to said top wall resting on said base plate defining an interior space between said top wall of said cover and said base plate.

11. The dynamically controlled cooling device of claim 10, said cover having a lip extending radially outward from said distal edge of said outer wall, said lip having a planar bottom surface abutting said base plate.

12. The dynamically controlled cooling device of claim 11, a power supply on positioned in said interior space, said power supply being electrically coupled to said fan direction motor and said fan tilt motor.

13. A dynamically controlled cooling device comprising:
- a stand, said stand having a plurality of legs, said legs being deployable wherein said stand is configured for positioning on a floor in a selectable position, said stand including a yoke rotationally coupled to a vertical support of said stand;
- a fan coupled to said stand, said fan being pivotally coupled to said yoke, said fan having a guard extending around rotatable blades, said guard having a front screen and a peripheral wall extending from a peripheral edge of said front screen;
- a fan direction motor coupled to said stand, said fan direction motor selectively rotating said fan relative to said stand;
- a camera coupled to said fan, said camera having a targeting function wherein said camera is configured for identifying a person within a field of vision of the camera, said camera being directed outwardly from said fan such that said fan is configured to direct air flow in an equivalent direction as said camera is directed;
- a processor operationally coupled to said camera and said fan direction motor wherein said processor activates said fan direction motor such that the fan direction motor is configured to rotate said fan to point at the person;
- a base plate coupled to said stand, said yoke being positioned over said base plate;
- a plurality of casters coupled to said yoke, each of said casters being positioned to roll on said base plate wherein said casters facilitate rotation of said fan relative to said stand;
- a fan tilt motor coupled to said yoke and said fan, said fan tilt motor selectively pivoting said fan relative to said yoke, said processor being operationally coupled to said fan tilt motor wherein said processor activates said fan tilt motor such that said fan tilt motor is configured to tilt the fan to point at the person;
- a fan pivot clamp coupled to said yoke, said fan pivot clamp restricting pivoting of said fan relative to said yoke when said fan pivot clamp is engaged to said fan, said fan being pivotable relative to said yoke when said fan pivot clamp is disengaged from said fan;
- a bracket coupled to said fan, said bracket having a camera connection flange extending upwardly from an apex of said fan, said camera being coupled to said camera connection flange, said camera connection flange being coplanar with said peripheral edge of said front screen, said camera being positioned on a front face of and extending forwardly from said camera connection flange;
- a cover having a top wall and an outer wall extending from said top wall, said top wall having a slot, said yoke having a pair of uprights extending through said slot, said fan being coupled to said uprights such that said fan is positioned over said top wall, a distal edge of said outer wall relative to said top wall resting on said base plate defining an interior space between said top wall of said cover and said base plate, said cover having a lip extending radially outward from said distal edge of said outer wall, said lip having a planar bottom surface abutting said base plate; and
- a power supply on positioned in said interior space, said power supply being electrically coupled to said fan direction motor and said fan tilt motor.

\* \* \* \* \*